United States Patent [19]
Wolff

[11] Patent Number: 4,730,445
[45] Date of Patent: Mar. 15, 1988

[54] ROTARY MOWER

[75] Inventor: Michel Wolff, Hochfelden, France

[73] Assignee: Kuhn, S.A., Saverne, France

[21] Appl. No.: 874,650

[22] Filed: Jun. 16, 1986

[30] Foreign Application Priority Data

Jun. 17, 1985 [FR] France ............................ 85 09292

[51] Int. Cl.⁴ ............................................ A01D 34/66
[52] U.S. Cl. ...................................... 56/13.6; 56/295; 56/320.1
[58] Field of Search ................. 56/6, 13.6, 320.1, 235, 56/295, 13.7, 17.5, 255

[56] References Cited

U.S. PATENT DOCUMENTS

| 4,110,959 | 9/1978 | Oosterling et al. | 56/6 |
| 4,157,004 | 6/1979 | van der Lely | 56/295 |
| 4,166,350 | 9/1979 | Werner | 56/13.6 |
| 4,235,069 | 11/1980 | Oosterling et al. | 56/13.6 |
| 4,292,790 | 10/1981 | Mathews | 56/6 |
| 4,443,998 | 4/1984 | Neuerburg | 56/295 |
| 4,577,456 | 3/1986 | van der Lely et al. | 56/13.6 |

FOREIGN PATENT DOCUMENTS

| 1534878 | 2/1968 | France . |
| 2247155 | 5/1975 | France . |
| 2306621 | 11/1976 | France . |
| 2326856 | 5/1977 | France . |
| 2332694 | 6/1977 | France . |
| 2521389 | 8/1983 | France . |
| 2083736 | 3/1982 | United Kingdom . |

Primary Examiner—Stephen J. Novosad
Assistant Examiner—Bruce M. Kisliuk
Attorney, Agent, or Firm—Oblon, Fisher, Spivak, McClelland & Maier

[57] ABSTRACT

The invention relates to a rotary mower driven from below. According to the invention, the upper part of a beam (4) comprises, in the vicinity of cutting elements (5, 7) which rotate in a high plane of rotation, a bulge (30, 32) the upper face of which is at least approximately planar and extends at least approximately parallel to the plane of rotation. The bulges (30, 32) cover at least approximately the space of the upper face of the beam (4) located under the cutting tool support (51, 71) of the high cutting elements (5, 7), and in part at least approximately the space of the upper face of the beam (4) not swept by the cutting tools (9) of the neighboring low cutting elements (6, 8).

16 Claims, 4 Drawing Figures

ROTARY MOWER

FIELD OF THE INVENTION

This invention relates to a rotary mower provided with at least two cutting elements each one of which is made up of a cutting tool support provided with cutting tools. The cutting elements are placed above a beam and rotate in different planes of rotation. Each cutting element is connected to an upwardly directed shaft which is guided in rotation in a bearing fastened to the beam, and at least one of the cutting elements is driven by drive means supported by the beam.

BACKGROUND OF THE INVENTION

A rotary mower of this general type is known the drive means of which are housed in the beam and consist of pulleys keyed on said shafts directed upwardly and driven by a belt. These drive means do not make it possible to assure a synchronous driving of the cutting elements. The belt can slide on the pulleys during the working of the rotary mower when a cutting element which is driven by a pulley is braked or locked for a certain period of time for any reason (such as encounters with obstacles, heavy bundles of fodder, etc.). When the desynchronization between two adjacent cutting elements reaches a certain value, the cutting tools mounted on these cutting elements can collide if they are located on the same level. These collisions can cause breaking of the cutting tools or their fastenings.

Considering the high rotating speed of the cutting elements, a broken cutting tool or one torn from its cutting tool support can cause serious accidents to persons who are close to the rotary mower or even to the operator. Moreover, a cutting element that is equipped with a broken cutting tool or on which a cutting tool is missing performs unsatisfactory work.

To mitigate this serious drawback, the known rotary mower has each two adjacent cutting elements offset vertically in relation to one another so as to rotate in two different planes. Thus, the cutting tools of two adjacent cutting elements can no longer collide with one another even if the positions of the cutting elements are desynchronized.

The drawback of this known rotary mower resides in the fact that the space of the upper part of the beam located under the cutting elements rotating in a high plane of rotation and the space of the upper part of the beam not swept by the cutting tools of the neighboring elements rotating in a low plane of rotation both become fouled. This fouling of the upper part of the beam is not acceptable. On the one hand, it can impede the flow of cut fodder toward the rear and, on the other hand, it can impede the cutting itself if the fouling progresses forward into the working zone of the cutting tools.

OBJECT OF THE INVENTION

This invention aims at remedying the foregoing drawbacks of the known rotary mower.

SUMMARY OF THE INVENTION

The rotary mower according to the invention is characterized by the fact that the upper part of the beam comprises, in the vicinity of the cutting element which rotates in a high plane of rotation, a bulge the upper face of which is at least approximately planar and extends at least approximately parallel to the high plane of rotation. The bulge covers at least approximately the space of the upper face of the beam located under the cutting tool support of the high cutting element and (in part, at least) the space of the upper face of the beam not swept by the cutting tools of the neighboring cutting element rotating in a low plane of rotation.

With this arrangement, the space of the upper part of the beam located under the cutting tool support of the cutting element rotating in a high plane of rotation, as well as a part at least of the space of the upper part of the beam not swept by the cutting tools of the neighboring cutting element rotating in a low plane of rotation, can no longer be fouled. This results from the fact that the high cutting element continuously sweeps the upper face of the bulge during its rotation.

Other characteristics and advantages of the invention will become apparent from the following description of a non-limiting embodiment of the invention shown in the accompanying drawings.

DETAILED DESCRIPTION OF THE PRESENTLY PREFERRED EMBODIMENTS

Figure 1:
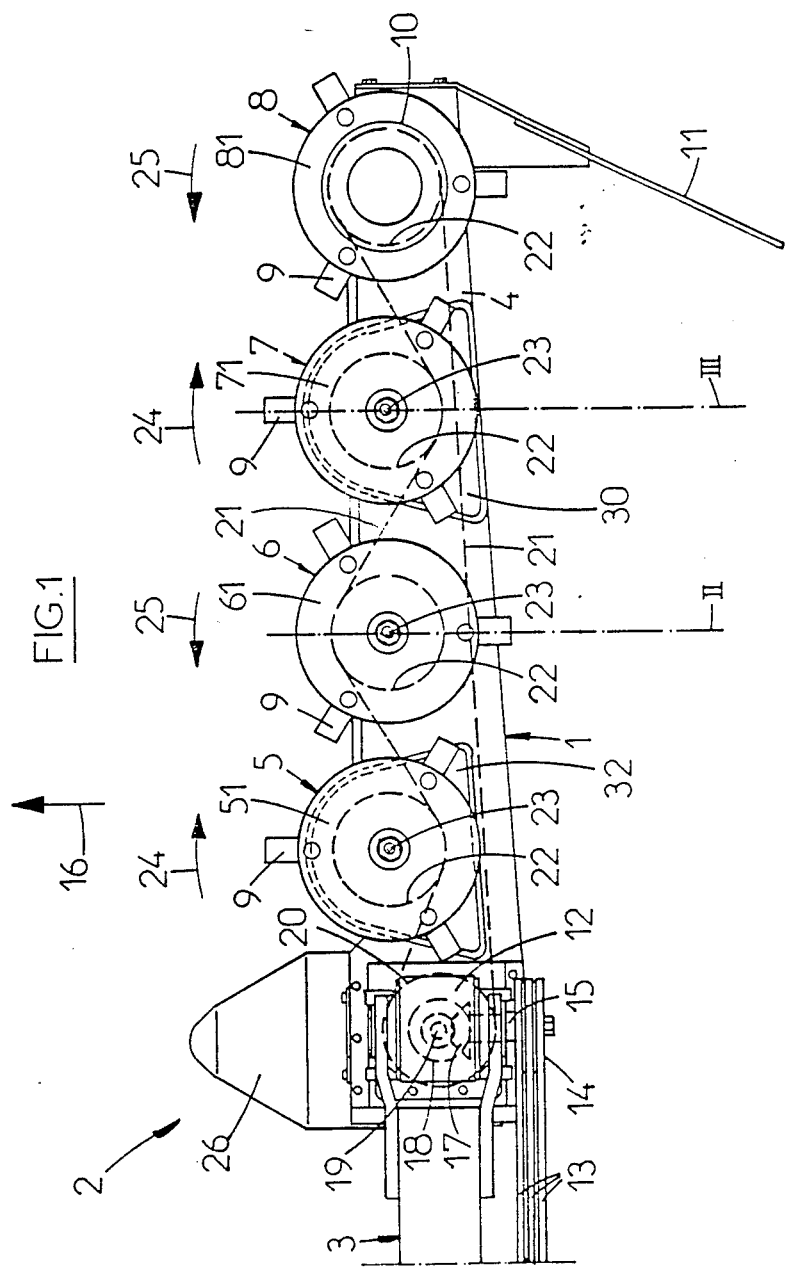
FIG. 1 is a top view of a cutting bar of a rotary mower according to the invention.

A cutting bar 1 of a rotary mower 2 according to the invention is shown in FIG. 1. The rotary mower 2 further comprises a hitching mechanism 3 which is only partially shown and which makes it possible to hitch the cutting bar 1 to a farm tractor, for example.

The cutting bar 1 comprises a beam 4 in which means for driving cutting elements 5, 6, 7, and 8 extend. The cutting elements 5, 6, 7, and 8 are mounted on the upper part of the beam 4. Each one of the cutting elements 5, 6, 7, and 8 is made up of a corresponding cutting tool support 51, 61, 71, and 81, respectively, provided with a plurality (in this case, three) of cutting tools 9. The cutting element 8 is located at the end of the cutting bar 1 away from the hitching mechanism 3, and it is surmounted by a rotating windrowing device 10. The rotating windrowing device 10 cooperates with a stationary windrowing device 11 to reduce the width of the windrow of cut fodder deposited behind the cutting bar 1.

A transmission housing 12 is mounted at the end of the cutting bar 1 located on the side of the hitching mechanism 3. The transmission housing 12 serves, on the one hand, to connect the cutting bar 1 to the hitching mechanism 3 and, on the other hand, to transmit the movement from belts 13 to the drive means extending in the beam 4 of the cutting bar 1. For this purpose, the transmission housing 12 comprises a pulley 14 on which the belts 13 are wound. The belts 13 also wind over another pulley (not shown) supported by the hitching mechanism 3. The latter pulley receives the movement from the power take-off (not shown) of the tractor (also not shown) to which the rotary mower 2 is hitched by means of a drive shaft (also not shown).

The pulley 14 is keyed on an input shaft 15 which extends at least approximately in the work direction 16. A bevel gear 17 is mounted on the end of the input shaft 15 inside the transmission housing 12. The bevel gear 17 meshes with a bevel gear 18 keyed on the upper end of an intermediate shaft 19. The intermediate shaft 19 extends at least approximately perpendicularly to the input shaft 15 and at least approximately vertically.

At the lower end of the intermediate shaft 19 is keyed a drive wheel 20 which extends at least approximately perpendicularly to the intermediate shaft 19. On the drive wheel 20 is wound an endless drive element 21 which then successively acts on a wheel 22 placed on each one of the cutting elements 5, 6, 7, and 8. Each one of the wheels 22 is keyed on a corresponding upwardly directed shaft 23 which supports the corresponding cutting element 5, 6, 7, or 8. After its winding on the outermost wheel 22 (i.e., the wheel 22 corresponding to the cutting element 8), the endless drive element 21 returns to the drive wheel 20. Driving and rotation is achieved so that adjacent cutting elements 5, 6, 7, and 8 rotate in opposite directions, as indicated by the arrows 24 and 25.

Under the transmission housing 12 is placed a shoe 26 which enables this end of the cutting bar 1 to slide on the ground and keeps cut fodder from hooking on the transmission housing 12.

Figure 2:
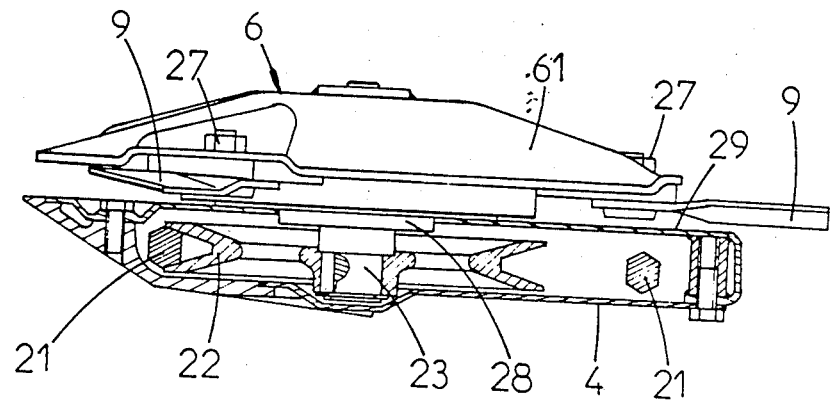
FIG. 2 is a view in section of the cutting bar of FIG. 1 along the plane II in FIG. 1 (only the beam of the cutting bar having been shown in section).
Figure 3:
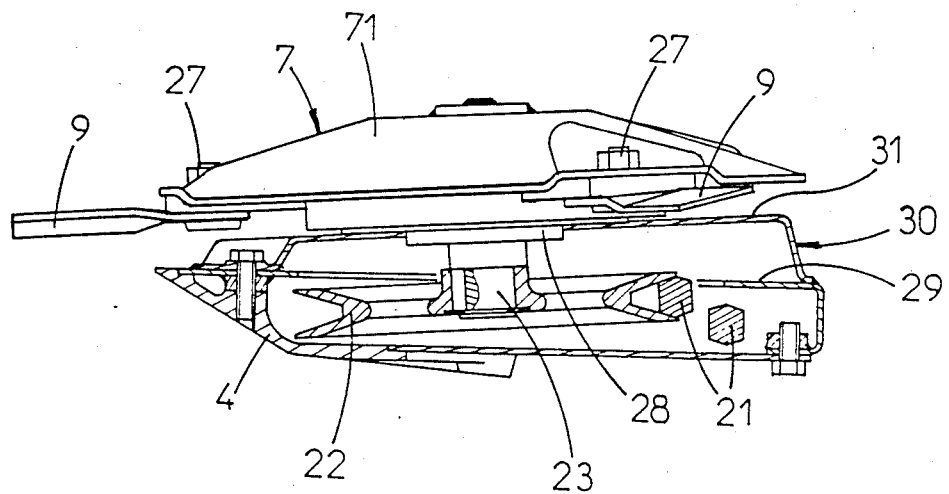
FIG. 3 is a view in section of the cutting bar of FIG. 1 along plane III in FIG. 1 (only the beam of the cutting bar having been shown in section).

As can be seen in FIGS. 2 and 3, the endless drive element 21 and the wheels 22 are housed in the beam 4. The drive wheel 20 (see FIG. 1) is also housed in the beam 4. These drive means cannot prevent the cutting elements 5, 6, 7, and 8 from desynchronizing during work. To keep the cutting tools 9 from colliding, the cutting elements 5, 7 rotate in different and higher planes of rotation than the planes of rotation in which the cutting elements 6 and 8 rotate. The cutting tools 9 on adjacent cutting elements 5, 6, 7, and 8 can thus sweep common zones in plan view, without the cutting tools 9 being able to touch one another even if they sweep the zones at approximately the same time after having become desynchronized.

FIG. 2 shows the arrangement of one of the low cutting elements—namely, the cutting element 6. The cutting element 6 is provided with cutting tools 9 which are connected to the cutting tool support 61 by means of a connection 27 enabling each cutting tool 9 to pivot backwardly and to line up under the cutting tool support 61 in case an obstacle is encountered.

The cutting element 6 is fastened to the upper end of the corresponding shaft 23. The shaft 23 is guided in rotation in a bearing 28 fastened to the upper part of the beam 4. The corresponding wheel 22 is keyed to the lower end of the shaft 23. As previously explained, the wheel 22 serves to drive the low cutting element 6 in rotation.

As can be seen in FIG. 2, during the rotation of the cutting element 6, the cutting tools 9 rotate in a plane of rotation extending at least approximately parallel to the upper face 29 of the beam 4 and relatively close to the upper face 29.

The description which has just been made of the arrangement of the low cutting element 6 is also valid for the low cutting element 8.

FIG. 3 shows the arrangement of one of the high cutting elements—namely, the cutting element 7. The cutting element 7 is also provided cutting tools 9 which are connected to the cutting tool support 71 by means of a connection 27 enabling each cutting tool 9 to pivot backwardly and to line up under the cutting tool support 71 in case an obstacle is encountered.

Moreover, the cutting element 7 is also fastened to the upper end of the corresponding shaft 23. The shaft 23 is also guided in rotation in a corresponding bearing 28 fastened to the upper part of the beam 4. The corresponding wheel 22 is also keyed to the lower end of the shaft 23. As previously explained, the wheel 22 serves to drive the cutting element 7 in rotation.

Whereas in the case of FIG. 2, which shows the low cutting element 6, the shaft 23 is approximately perpendicular to the upper face 29 of the beam 4, in the case of FIG. 3, which shows the high cutting element 7, the shaft 23 is inclined toward the front in relation to the upper face 29 of the beam 4. In addition, the shaft 23 of the high cutting element 7 extends higher in relation to the upper face 29 of the beam 4 than does the shaft 23 of the low cutting element 6.

The position of the shaft 23 of the high cutting element 7 is defined by a bulge 30 in the upper part of the beam 4. The upper face 31 of the bulge 30 is at least approximately planar and extends at least approximately parallel to the plane of rotation of the cutting tools 9. Moreover, the plane of rotation of the cutting tools 9 extends relatively close to the upper face 31 of the bulge 30. Advantageously, the distance between the plane of rotation of the cutting tools 9 of the high cutting element 7 and the upper face 31 of the bulge 30 is at least approximately equal to the distance between the plane of rotation of the cutting tools 9 of the low cutting elements 6 and 8 and the upper face 29 of the beam 4. As can be seen in FIG. 3, the upper face 31 of the bulge 30 is inclined toward the front.

The description that has just been made of the arrangement of the high cutting element 7 is also valid for the high cutting element 5. A bulge 32 extends under the high cutting element 5 and has, in section, at least approximately the same shape as the bulge 30 which extends under the high cutting element 7.

Figure 4:
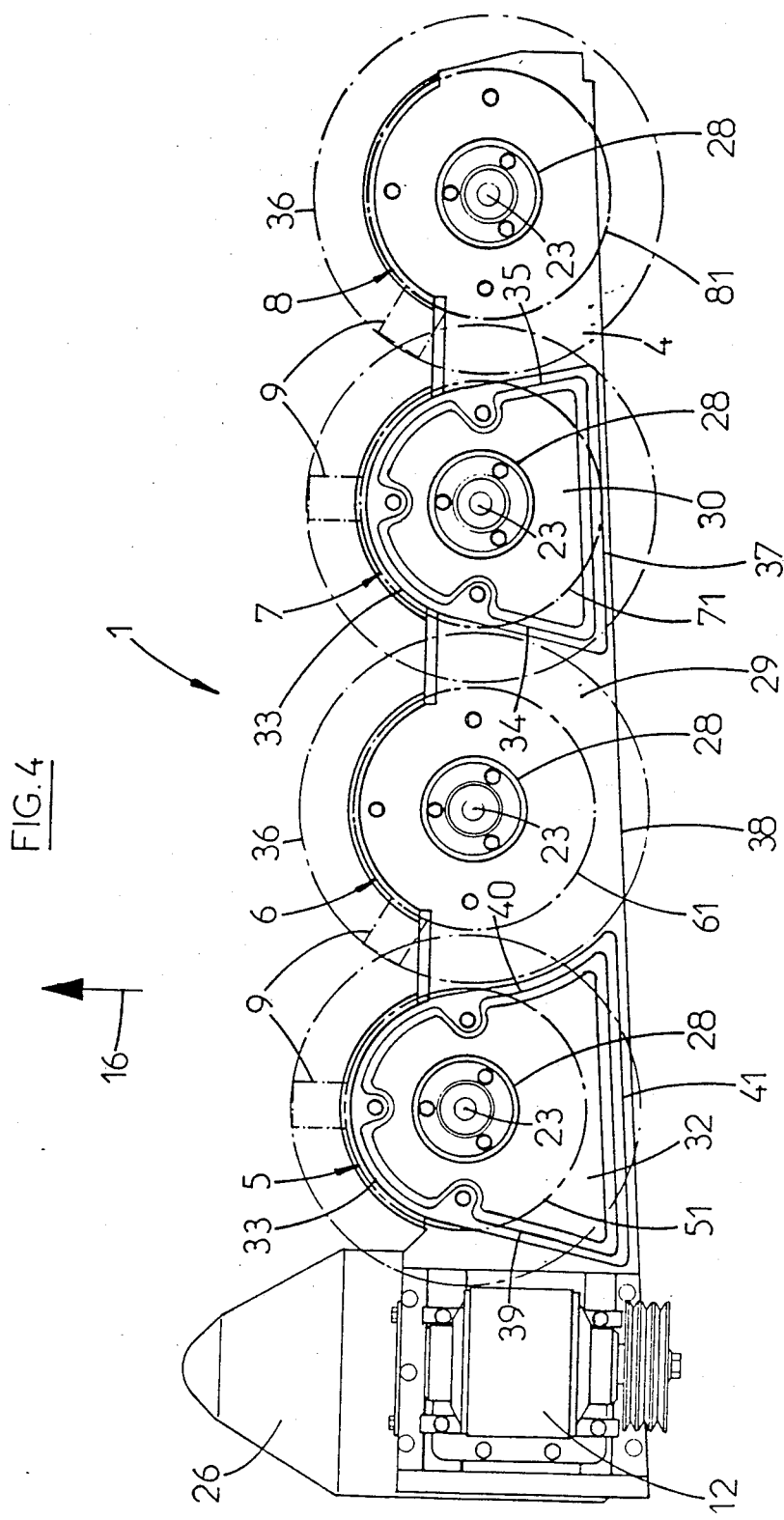
FIG. 4 is a top view of the cutting bar of FIG. 1 slightly modified, on which the cutting elements have been drawn in dot-and-dash lines.

FIG. 4 shows the cutting bar 1 of FIG. 1 in slightly modified form. In this figure, the cutting elements 5, 6, 7, and 8 have been shown in dot-and-dash lines so that the upper part of the beam 4 is visible. In FIG. 4, the shapes of the bulges 30 and 32 are seen in plan view. The bulges 30 and 32 extend under the high cutting elements 5 and 7 and cover approximately the space of the upper face 29 of the beam 4 located under the high cutting tool supports 51 and 71 of the high cutting elements 5 and 7.

The front edge 33 of each bulge 30, 32 is at least approximately circular. In addition, each front edge 33 extends at least approximately under the end path swept by the cutting tool support 51, 71 of the corresponding high cutting element 5, 7 under which the bulge 30, 32 is placed, and advantageously slightly back from that path.

The lateral edges 34, 35 of the bulge 30 placed under the high cutting element 7 located farthest from the transmission housing 12 extend in part at least approximately tangentially to the end path 36 swept by the cutting tools 9 of the low cutting element 6, 8 which are placed on each side of the high cutting element 7. In addition, the lateral edges 34, 35 diverge toward the back in relation to the work direction 16, and move away approximately symmetrically in relation to a vertical plane at least approximately directed in the work direction 16 and going at least approximately through the longitudinal axis of the shaft 23 of the high cutting element 7.

At the rear, the back edge 37 of the bulge 30 fits at least approximately the back edge 38 of the beam 4.

With this shape, it is seen that the bulge 30, in top view, is at least approximately symmetrical in relation to a vertical plane at least approximately parallel to the work direction 16 and going at least approximately through the longitudinal axis of the shaft 23 of the high cutting element 7.

In regard to the bulge 32 placed under the high cutting element 5 located near the transmission housing 12, its lateral edge 39 located opposite the transmission housing 12 is at least approximately parallel to the lateral edge 34 of the bulge 30 located under the high cutting element 7 farthest from the transmission housing 12. Its lateral edge 40 extending opposite the adjacent low cutting element 6, on the other hand, has a different shape. As seen in FIG. 4, the lateral edge 40 of the bulge 32 at least approximately fits in part at least, and particularly toward the rear, the end path 36 swept by the cutting tools 9 of the neighboring low cutting element 6.

The back edge 41 of the bulge 32 also at least approximately fits the back edge 38 of the beam 4.

Thanks to the shapes that have just been described, the bulges 30, 32 also cover in part at least the space of the upper face 29 of the beam 4 not swept by the cutting tools 9 of the low cutting elements 6 and 8.

The machine that has just been described functions as follows.

During work, the rotary mower 2 is hitched to a farm tractor by the hitching mechanism 3. The power take-off (not shown) of the tractor (not shown) drives the pulley 14 by a drive shaft (not shown) which acts on a first pulley (not shown), and the first pulley in turn drives the pulley 14 by the belts 13. The pulley 14 drives the drive wheel 20 via the input shaft 15, the bevel gears 17 and 18, and the intermediate shaft 19. Distribution of the movement to the cutting elements 5, 6, 7, and 8 is then made by the endless drive element 21, which acts on the wheels 22.

In rotating, the cutting tools 9 extend radially outwardly under the effect of centrifugal force and cut the fodder as the rotary mower 2 advances in the work direction 16. During work, it can happen that the cutting tools 9 come in contact with the earth. Earth mixed with vegetable debris is then carried backward by the cutting tools 9.

Since the cutting tools 9 of the low cutting elements 6 and 8 rotate in a plane of rotation which extends very close to the upper face 29 of the beam 4, the earth carried by the cutting tools 9 cannot stick to the upper face 29 of the beam 4, and it is accordingly deposited behind the cutting bar 1 by the cutting tools 9. In the case of the high cutting elements 5 and 7, thanks to the arrangement of the bulges 30 and 32, the same phenomenon occurs. The upper faces 31 of the bulges 30 and 32 extend very close to the plane of rotation of the cutting tools 9 of the high cutting elements 5 and 7. Accordingly, there too the earth carried by the cutting tools 9 cannot stick to the upper faces 31 of the bulges 30 and 32, but instead is deposited behind the cutting bar 1 by the cutting tools 9. The upper part of the beam 4 of the rotary mower 2 according to the invention thus always remains relatively clean.

Within the context of the invention, it is perfectly possible to make the lateral edges 34 and 35 of the bulge 30 fit the end path 36 of the cutting tools 9 of the neighboring low cutting elements 6 and 8, as does the lateral edge 40 of the bulge 32. Also, it is possible, within the context of the invention, for the lateral edge 40 of the bulge 32 to extend at least approximately tangentially to the end path 36 of the cutting tools 9 of the neighboring low cutting element 6.

Moreover, it is also possible in the invention to have the bulge 32 at least approximately identical with the bulge 30 (as illustrated in FIG. 1). The cost of the cutting bar 1 is thus lowered, since there is only one type of bulge to make.

In addition, the drive means which may not assure the driving in synchronous rotation of the cutting elements 5, 6, 7, and 8 can be different from those described. They can, for example, consist of motors that are electric, hydraulic, pneumatic, etc.

Finally, it will not be going outside the scope of the invention if various modifications or improvements are made in the examples that have just been described.

What is claimed as new and desired to be secured by Letters Patent of the United States is:

1. A rotary mower adapted to be moved in a work direction during use, said rotary mower comprising:
    (a) a beam having an upper face;
    (b) at least one first cutting element extending above said beam, said at least one first cutting element being connected to an upwardly directed shaft having a longitudinal axis, said upwardly directed shaft being guided in rotation on said beam, said at least one first cutting element being made up of a cutting tool support provided with cutting tools rotating in a first plane of rotation;
    (c) at least one second cutting element extending above said beam and located adjacent to said at least one first cutting element, said at least one second cutting element being connected to an upwardly directed shaft having a longitudinal axis, said upwardly directed shaft being guided in rotation on said beam, said at least one second cutting element being made up of a cutting tool support provided with cutting tools rotating in a second plane of rotation, said second plane of rotation being lower than said first plane of rotation during use of said rotary mower, the volume swept by said cutting tools associated with said at least one second cutting element partially overlapping the volume swept by said cutting tools associated with said at least one first cutting element;
    (d) drive means for driving a first one of said cutting elements in rotation; and
    (e) transmitting means for transmitting the drive from said first one of said cutting elements to the second one of said cutting elements to drive said second one of said cutting elements in rotation, said transmitting means being able to be desynchronized;
    (f) said upper face of said beam comprising in the vicinity of said at least one first cutting element a bulge having an upper face, said upper face of said bulge being at least approximately planar and extending at least approximately parallel to said first plane of rotation of said at least one first cutting element, said bulge covering:
        (i) at least approximately the space of said upper face of said beam located under said cutting tool support associated with said at least one first cutting element and (ii) in part at least the space of said upper face of said beam not swept by said cutting tools of said at least one second cutting element.

2. A rotary mower according to claim 1 wherein said bulge has a front edge which is at least approximately circular.

3. A rotary mower according to claim 1 wherein:
   (a) said bulge has a front edge;
   (b) said cutting tool support associated with said at least one first cutting element sweeps an exterior path when said at least one first cutting element rotates; and
   (c) said front edge of said bulge extends approximately under said exterior path swept by said cutting tool support associated with said at least one first cutting element.

4. A rotary mower according to claim 3 wherein said front edge of said bulge extends slightly back from said exterior path swept by said cutting tool support associated with said at least one first cutting element.

5. A rotary mower according to claim 1 wherein:
   (a) said bulge has a lateral edge;
   (b) said cutting tools associated with said at least one second cutting element sweep an exterior path when at least one second cutting element rotates; and
   (c) said lateral edge of said bulge faces said at least one second cutting element and extends in part at least approximately tangentially to said exterior path swept by said cutting tools of said at least one second cutting element.

6. A rotary mower according to claim 5 wherein said lateral edge of said bulge facing said at least one second cutting element at least approximately fits in part at least the exterior path swept by said cutting tools of said at least one second cutting element.

7. A rotary mower according to claim 1 wherein:
   (a) said bulge has a lateral edge which faces said at least one second cutting element; and
   (b) in use, said lateral edge moves away, in a direction opposite said work direction, from a vertical plane at least approximately parallel to said work direction and going at least approximately through said longitudinal axis of said upwardly directed shaft of said at least one first cutting element.

8. A rotary mower according to claim 1 wherein:
   (a) said rotary mower comprises at least two second cutting elements;
   (b) said at least one first cutting element is located between two of said at least two second cutting elements; and
   (c) said bulge is, in top view during use, at least approximately symmetrical in relation to a vertical plane at least approximately parallel to said work direction and going at least approximately through said longitudinal axis of said upwardly directed shaft of said at least one first cutting element.

9. A rotary mower according to claim 8 wherein said bulge has two lateral edges which:
   (a) diverge in a direction opposite said work direction and
   (b) move away at least approximately symmetrically from said vertical plane.

10. A rotary mower according to claim 1 wherein:
    (a) said beam has a back edge;
    (b) said bulge has a back edge; and
    (c) said back edge of said bulge at least approximately fits said back edge of said beam.

11. A rotary mower according to claim 1 comprising a plurality of said first cutting elements and a plurality of associated bulges on said upper face of said beam, all of said plurality of bulges being at least approximately identical.

12. A rotary mower according to claim 1 wherein said upper face of said bulge determines said first plane of rotation.

13. A rotary mower according to claim 1 wherein said drive means is supported by said beam.

14. A rotary mower according to claim 1 wherein:
    (a) said bulge has a lateral edge;
    (b) said rotary mower comprises at least two second cutting elements;
    (c) said cutting tools of a first one of said at least two second cutting elements sweep an exterior path when said first one of said at least two second cutting elements rotates; and
    (d) said lateral edge of said bulge is located opposite a second one of said at least two second cutting elements and extends in part at least approximately tangentially to said exterior path swept by said cutting tools of said first one of said at least two second cutting elements.

15. A rotary mower according to claim 14 wherein said lateral edge of said bulge located opposite said second one of said at least two second cutting elements at least approximately fits in parts at least the exterior path swept by said cutting tools of said first one of said at least two second cutting elements.

16. A rotary mower according to claim 1 wherein:
    (a) said rotary mower comprises at least two second cutting elements;
    (b) said bulge has a lateral edge which is located opposite a first one of said at least two second cutting elements; and
    (c) in use, said lateral edge moves away, in a direction opposite said work direction, from a vertical plane at least approximately parallel to said work direction and going at least approximately through said longitudinal axis of said upwardly directed shaft of said at least one first cutting element.

* * * * *